（12）United States Patent
Watanabe et al.

(10) Patent No.: US 10,353,768 B2
(45) Date of Patent: Jul. 16, 2019

(54) COMPUTER SYSTEM AND COMPUTER SYSTEM CONTROL METHOD

(71) Applicant: Hitachi, Ltd., Tokyo (JP)

(72) Inventors: Satoru Watanabe, Tokyo (JP); Yoshiki Kurokawa, Tokyo (JP); Yoshitaka Tsujimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 64 days.

(21) Appl. No.: 15/571,050

(22) PCT Filed: Jun. 29, 2015

(86) PCT No.: PCT/JP2015/068646
§ 371 (c)(1),
(2) Date: Nov. 1, 2017

(87) PCT Pub. No.: WO2017/002157
PCT Pub. Date: Jan. 5, 2017

(65) Prior Publication Data
US 2018/0165148 A1    Jun. 14, 2018

(51) Int. Cl.
*G06F 11/00* (2006.01)
*G06F 11/10* (2006.01)
(Continued)

(52) U.S. Cl.
CPC ........ *G06F 11/1004* (2013.01); *G06F 3/0604* (2013.01); *G06F 3/0659* (2013.01);
(Continued)

(58) Field of Classification Search
CPC .. G06F 11/1004; G06F 16/2455; G06F 16/00; G06F 3/0604; G06F 3/0659;
(Continued)

(56) References Cited

U.S. PATENT DOCUMENTS 8,095,508 B2    1/2012 Chamberlain et al.
9,740,439 B2 *  8/2017 Franceschini ......... G06F 3/0601
(Continued)

OTHER PUBLICATIONS

"Error Detection and Recovery Using CRC in Altera FPGA Devices", Altera, Application Note 357, Jul. 2008, Version 1.4.
(Continued)

*Primary Examiner* — Christine T. Tu
(74) *Attorney, Agent, or Firm* — Mattingly & Malur, PC (57) ABSTRACT

A computer including a processor and a memory and a storage device that is connected to the computer and stores data has an FPGA that acquires data and an operation command from a control unit that controls reading and writing with respect to a non-volatile semiconductor storage unit to perform a data operation. The computer generates and transmits the operation command from an access request that has been received to the storage device. The computer receives execution results for the operation command from the storage device, and when the number of execution results for the operation command reaches a prescribed value, instructs the FPGA to detect a soft error, receives all execution results with respect to the generated operation command, and if there is no soft error, transmits the execution results.

12 Claims, 8 Drawing Sheets

(51) Int. Cl.
  *G06F 16/2455*  (2019.01)
  *G06F 3/06*  (2006.01)
  *G06F 16/00*  (2019.01)

(52) U.S. Cl.
  CPC ............ *G06F 3/0679* (2013.01); *G06F 16/00* (2019.01); *G06F 16/2455* (2019.01)

(58) Field of Classification Search
  CPC .............. G06F 3/0679; G06F 11/0751; G06F 11/0754; G06F 11/0766; G06F 11/079; G06F 11/0793; G06F 11/08; G06F 11/085; G06F 11/14; G06F 11/16; G06F 3/0688; G06F 3/0689; G06F 3/0683
  See application file for complete search history.

(56) References Cited

U.S. PATENT DOCUMENTS

| | | | | |
|---|---|---|---|---|
| 2008/0077752 | A1* | 3/2008 | Kinoshita | G06F 11/0727 711/154 |
| 2011/0066884 | A1* | 3/2011 | Suzuki | G06F 11/1441 714/14 |
| 2014/0095928 | A1 | 4/2014 | Ogasawara et al. | |

OTHER PUBLICATIONS

International Search Report of PCT/JP2015/068646 dated Sep. 29, 2015.

* cited by examiner

| DB OPERATION COMMAND NAME | FRAME NUMBER |
|---|---|
| FILTERING COMMAND | 1,2,3,100,102 |
| AGGREGATION OPERATION COMMAND | 1,2,3,,110,112 |
| ⋮ | ⋮ |

COMPUTER SYSTEM AND COMPUTER SYSTEM CONTROL METHOD

BACKGROUND

This invention relates to a computer system including an accelerator utilizing an FPGA.

In recent years, a technology that utilizes a field-programmable gate array (FPGA) has been employed to make it perform part of data processing. For example, U.S. Pat. No. 8,095,508 B discloses data processing with a device including an FPGA coupled to a computer.

When an FPGA is used, collision of neutrons may generate a soft error that causes an erroneous result of hardware implementation.

As described in "Error Detection and Recovery Using CRC in Altera FPGA Devices" (ALTERA, Application Note 357), the vendors of FPGAs provide functions for soft error detection and recovery. A soft error checking function employed by an FPGA vendor divides the FPGA into small regions called frames and calculates cyclic redundancy codes (CRC) for the frames in advance. The checking function of the FPGA determines whether any error exists in each frame with the CRC and if an error exists, transmits an error signal to the external of the FPGA. US 2014/0095928 A discloses a storage control device in which, when a detection unit detects a soft error, a communication controller changes the state of the communication path between the communication device and the host device into a busy state.

SUMMARY

As disclosed in the aforementioned "Error Detection and Recovery Using CRC in Altera FPGA Devices", checking for a soft error in an FPGA takes several milliseconds to several seconds. Accordingly, data processing with an FPGA has a problem that the time for soft error checking increases if the soft error checking is detected every time a command is executed. Furthermore, if the error checking is performed on the entirety of the FPGA circuit, the error checking needs much more time.

This invention has been accomplished in view of the above-described problems and an object of this invention is to reduce the increase in processing time because of the soft error checking when data is processed with an FPGA.

A representative aspect of the present disclosure is as follows. A computer system comprising: a computer including a processor and a memory; and a storage device connected with the computer and configured to store data, wherein the storage device includes: a non-volatile semiconductor storage unit including a non-volatile semiconductor memory and configured to store data; a controller configured to control read and write for the non-volatile semiconductor storage unit; and an FPGA configured to receive data and an operation command from the controller and perform an operation on the data in accordance with the operation command, wherein the computer includes: a receiving unit configured to receive an access request to the data; a command generation unit configured to generate one or more operation commands from the access request; a command transmitting unit configured to transmit the operation commands to the storage device; an operation result receiving unit configured to receive execution results of the operation commands from the storage device; an aggregation unit configured to aggregate the execution results of the operation commands; a responding unit configured to respond the aggregated execution results of the operation commands; and an FPGA checking unit configured to check for a soft error in the FPGA, wherein the FPGA checking unit is configured to instruct the FPGA to check for a soft error and receive a response whether a soft error exists from the FPGA when number of executed operation commands reaches a predetermined value, and wherein the responding unit is configured to transmit the aggregated execution results of the operation commands in a case where execution results of all the generated operation commands have been received and no soft error exists.

According to this invention, a computer checks for a soft error in an FPGA after issuing a plurality of commands to a storage device including the FPGA. Accordingly, the time required for the soft error checking can be reduced, compared to the case where the soft error checking is detected separately for individual commands. Furthermore, the computer detects the soft error checking on only the regions of the FPGA used by the issued commands, which can further reduce the time required for the soft error checking.

DETAILED DESCRIPTION OF THE EMBODIMENTS

Hereinafter, embodiments of this invention are described using the accompanying drawings.

Embodiment 1

Figure 1:
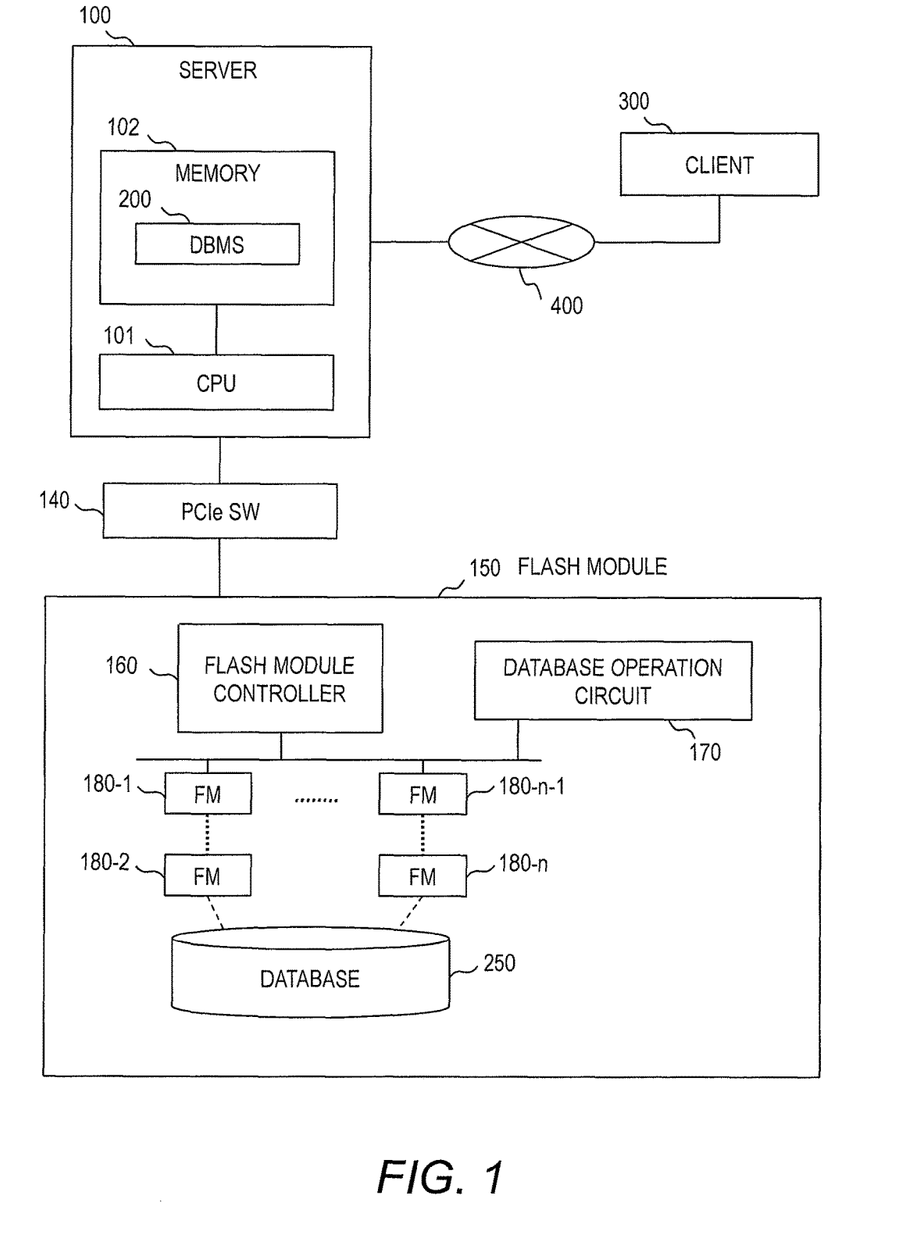
FIG. 1 is a block diagram for illustrating an example of a computer system according to a first embodiment of this invention.

FIG. 1 is a block diagram for illustrating an example of a computer system, representing the first embodiment of this invention. FIG. 1 provides an example where a flash module 150 including the functions of a storage device and an accelerator is coupled to a server 100 for executing a database management system (DBMS) 200.

The flash module 150 in this embodiment includes a plurality of flash memories 180-1 to 180-*n* for storing a database 250 and a database operation circuit 170 as a hardware accelerator capable of database processing.

The server 100 includes a CPU 101 and a memory 102, and is connected with the flash module 150 via a PCI Express (shown as PCIe in the drawing) switch 140. The flash module 150 includes one or more flash memories 180-1 to 180-*n*, a flash module controller 160 for controlling a semiconductor storage unit comprising the flash memories 180-1 to 180-*n*, and a database operation circuit 170 implemented by an FPGA to perform predetermined database processing.

In the following description, the suffixes following "-" in the reference signs are omitted when generally describing the flash memories 180-1 to 180-*n* and the suffixes following "-" are provided when describing specific flash memories 180-1 to 180-*n*. The same applies to the other elements.

A database 250 is stored in the flash memories 180 in the flash module 150. The server 100 loads the program of the DBMS 200 to the memory 102 and executes the program with the CPU 101. The database 250 is managed by the DBMS 200 in the server 100. The program of the DBMS 200 can be stored in a storage device (not shown) connected with the server 100.

The DBMS 200 running on the server 100 receives a request (an SQL statement) to access the database 250 from a client computer 300 connected via a network 400. Upon receipt of a specific access request such as a search request (for filtering), the DBMS 200 generates a plurality of database operation commands and instructs the database operation circuit 170 to perform database processing.

The flash module controller 160 can access the flash memories 180-1 to 180-*n* in parallel; when a plurality of database operation commands are issued, the flash module controller 160 reads the database 250 from the flash memories 180 in parallel to forward the database 250 to the database operation circuit 170.

The database operation circuit 170 can execute database operation commands in parallel at a predetermined parallelism. The database operation circuit 170 can execute a plurality of database operation commands on the data of the database 250 received from the flash module controller 160 in parallel.

The database operation circuit 170 including an FPGA has the functions for soft error detection and recovery that are referred to in the aforementioned "Error Detection and Recovery Using CRC in Altera FPGA Devices". The server 100 detects soft error checking each time the number of database operation commands issued to the database operation circuit 170 reaches a predetermined value. If the database operation circuit 170 detects a soft error, the server 100 transmits information indicating occurrence of a soft error to the client computer 300.

Figure 2:
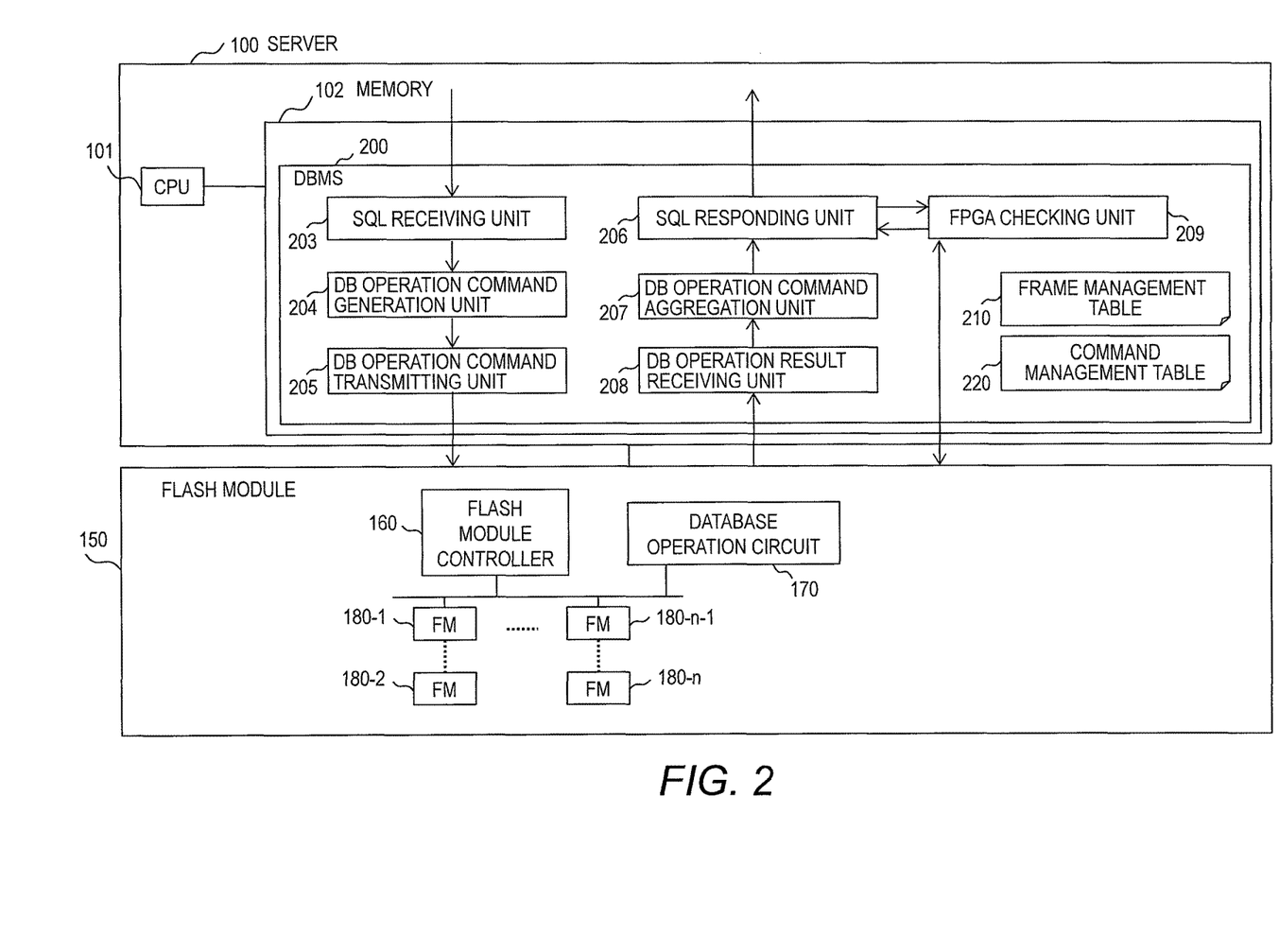
FIG. 2 is a block diagram for illustrating an example of the functions of the DBMS according to the first embodiment of this invention.

FIG. 2 is a block diagram for illustrating an example of the functions of the DBMS 200. The DBMS 200 includes an SQL receiving unit 203 for receiving an SQL statement of an access request, a database (DB in the drawings) operation command generation unit 204 for generating one or more database operation commands from the SQL statement, a DB operation command transmitting unit 205 for transmitting the generated database operation commands to the flash module 150, and a DB operation result reception unit 208 for receiving execution results of the database operation commands from the flash module 150, a DB operation command aggregation unit 207 for aggregating the execution results of the one or more database operation commands received from the flash module 150, an SQL responding unit 206 for transmitting the aggregated execution results of the database operation commands to the client terminal 300, an FPGA checking unit 209 for instructing the database operation circuit 170 implemented by an FPGA to check for a soft error, a frame management table 210 for managing the numbers of the frames to be used for each database operation command, and a command management table 220 for managing the database operation commands to be used for each SQL statement. The frames are the operational elements of the FPGA included in the database operation circuit 170.

Embodiment 1 describes the operational elements of the database operation circuit 170 that are programmable (configurable) with the FPGA as frames; however, the operational elements can be different ones depending on the type of the FPGA. For example, in the case where the programmable operational elements are logic elements, logic element numbers can replace the frame numbers. In other words, the frame numbers are the identifies of the programmable operational elements in the FPGA.

When an SQL statement received at the SQL receiving unit 203 is a specific access request such as a request for filtering, the DB operation command generation unit 204 divides the area of the database 250 to be accessed into a plurality of areas and generates a database operation command for each area.

For example, in the case where the capacity of each flash memory 180 is 8 MB, the DB operation command generation unit 204 divides the area to be accessed specified in the received SQL statement into areas including 8 MB and generates a database operation command for each area. The DB operation command transmitting unit 205 issues a plurality of database operation commands to the database operation circuit 170. A request to update the database 250 is executed by transmitting an instruction to update the database 250 from the DBMS 200 to the flash module controller 160.

Upon receipt of a database operation command, the database operation circuit 170 requests the flash module controller 160 to read the data in the data area specified in the database operation command. The flash module controller 160 reads the requested data from a flash memory 180 and forwards it to the database operation circuit 170. The database operation circuit 170 executes data processing (such as filtering or aggregating operational processing) on the received data in accordance with the specified database operation command and transmits the execution result to the DB operation result receiving unit 208.

The flash module controller 160 accesses the flash memories 180-1 to 180-*n* in parallel in units of flash memories. The database operation circuit 170 executes the database operation commands on the received data at a predetermined parallelism. The DBMS 200 receives the results of the database operation commands executed by the database operation circuit 170 at the predetermined parallelism at the DB operation result receiving unit 208.

The execution results of the plurality of database operation commands received at the DB operation result receiving unit 208 are aggregated by the DB operation command aggregation unit 207. The SQL responding unit 206 invokes the FPGA checking unit 209 upon completion of the aggregation at the DB operation command aggregation unit 207 with respect to all the database operation commands generated by the DB operation command generation unit 204.

The FPGA checking unit 209 refers the command management table 220 and the frame management table 210 with the database operation commands and identifies the frame numbers used by the database operation circuit 170. The FPGA checking unit 209 detects soft error checking on only the frames used by the database operation commands out of the FPGA of the database operation circuit 170.

The FPGA checking unit 209 transmits a result of the soft error checking to the SQL responding unit 206. The SQL responding unit 206 transmits the result of aggregation by the DB operation command aggregation unit 207 to the client computer 300 if no soft error occurs. On the other hand, if a soft error occurs, the SQL responding unit 206 transmits information indicating the occurrence of a soft error to the client computer 300.

Through the foregoing processing, the DBMS 200 generates a plurality of database operation commands from a received access request and makes the FPGA of the database operation circuit 170 execute the commands. After all the database operation commands corresponding to the SQL statement of the access request have been executed, the FPGA checking unit 209 detects soft error checking on the FPGA of the database operation circuit 170.

The DBMS 200 does not detect soft error checking each time one of the plurality of database operation commands has been executed but collectively detects soft error checking when a predetermined number (in this embodiment, all) of data base operation commands have been executed. This configuration saves the processing time required for soft error checking, compared to the case where soft error checking is detected each time a database operation command has been executed, and therefore expedites the processing of the database operation circuit 170 including the FPGA.

Furthermore, the DBMS 200 specifies the frame numbers of the FPGA configured as the database operation circuit 170 depending on the database operation command and detects soft error checking only on the specified frames. This configuration achieves reduction in processing time, compared to the case where the soft error checking is performed on the entire FPGA, and therefore expedites the database operations.

The function units included in the DBMS 200, namely the SQL receiving unit 203, the DB operation command generation unit 204, the DB operation command transmitting unit 205, the DB operation result receiving unit 208, the DB operation command aggregation unit 207, the SQL responding unit 206, and the FPGA checking unit 209, are loaded to the memory 102 as programs.

The CPU 101 performs processing in accordance with the programs of the function units to work as the function units providing the predetermined functions. For example, the CPU 101 performs processing in accordance with a DBMS program to function as the DBMS 200. The same applies to the other programs. Furthermore, the CPU 101 operates as the function units providing the functions of a plurality of processes executed by each program. The computer and the computer system are an apparatus and a system including these function units.

Figure 3:
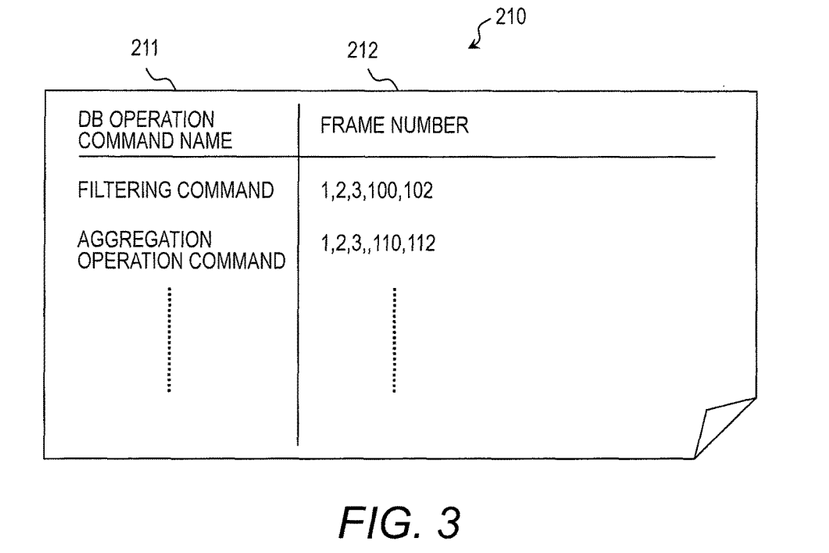
FIG. 3 is a diagram for illustrating an example of the frame management table in the DBMS according to the first embodiment of this invention.

FIG. 3 is a diagram for illustrating an example of the frame management table 210 in the DBMS 200. The frame management table 210 includes a DB operation command name 211 for storing the name of a database operation command and a frame number 212 for storing frame numbers of the FPGA configured as the database operation circuit 170 in one entry.

The example of FIG. 3 indicates that a filtering command used in an SQL statement uses the frame numbers 1, 2, 3, 100, and 102 among the frames of the FPGA configured as the database operation circuit 170.

Figure 4:
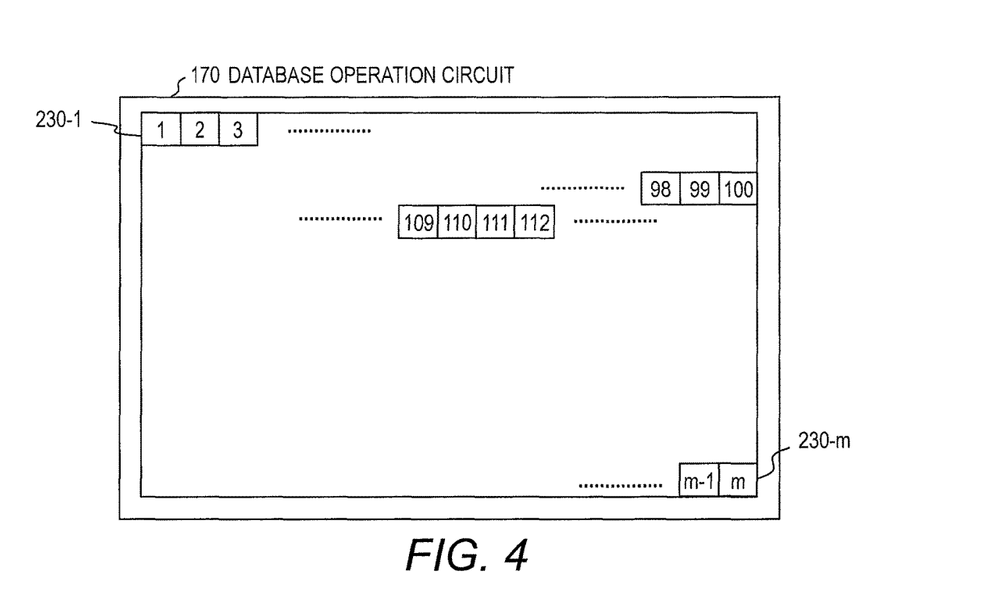
FIG. 4 is a diagram for illustrating an example of the frames of the FPGA of the database operation circuit according to the first embodiment of this invention.

FIG. 4 is a diagram for illustrating an example of the frames of the FPGA of the database operation circuit 170. The FPGA of the database operation circuit 170 has programmable regions of frames 230-1 to 230-$m$ and their frame numbers are 1 to m. As illustrated in FIG. 3, the administrator of the server 100 determines the frame numbers to be used for each database operation command name 211 in configuring the functions of the FPGA.

Figure 5:
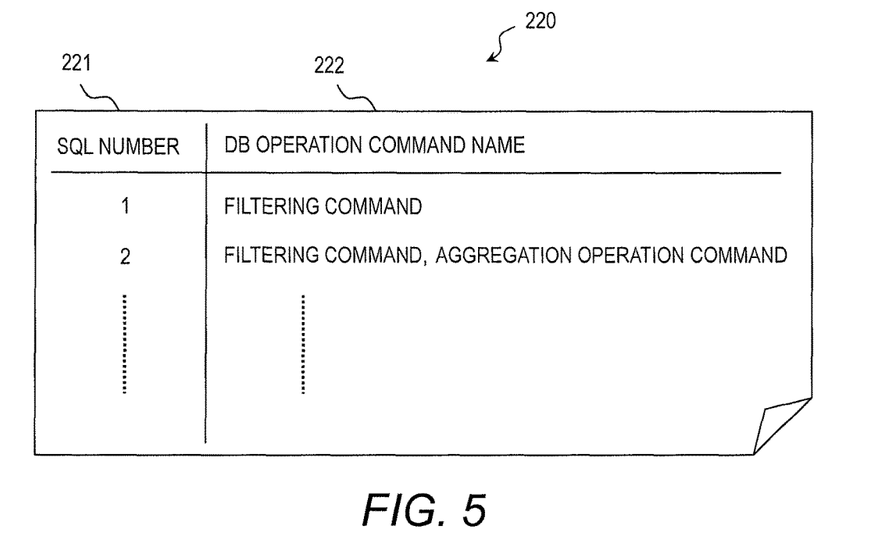
FIG. 5 is a diagram for illustrating an example of the command management table in the DBMS according to the first embodiment of this invention.

FIG. 5 is a diagram for illustrating an example of the command management table 220 in the DBMS 200. The command management table 220 includes an SQL number 221 for storing the serial number of a received SQL statement and a DB operation command name 222 for storing the names (or the identifiers) of the database operation commands included in the SQL statement in one entry.

Upon receipt of an SQL statement as an access request, the SQL receiving unit 203 assigns a predetermined number to the SQL statement, adds an entry to the command management table 220, and stores the names of the database operation commands included in the SQL statement to the DB operation command name 222. The command management table 220 enables identification of the database operation commands used in each SQL statement executed in the server 100.

Figure 6:
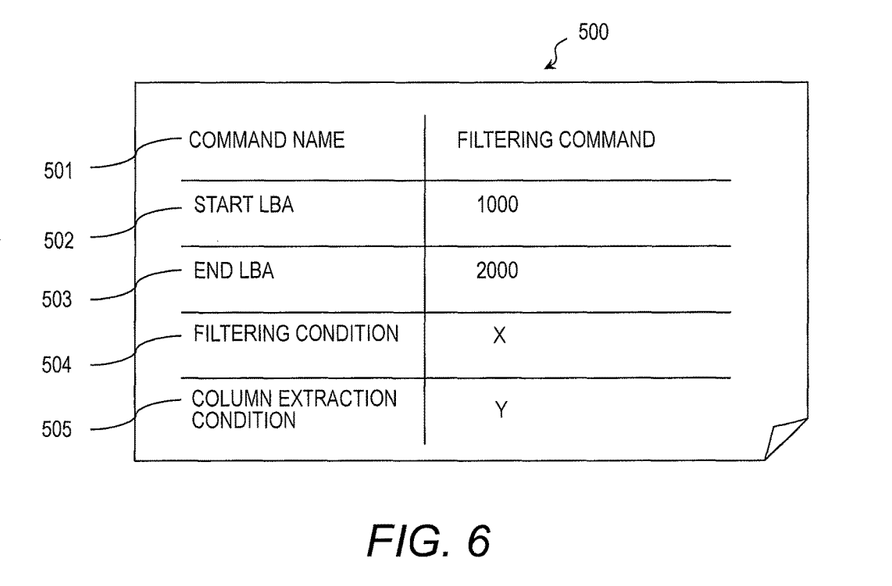
FIG. 6 is a diagram for illustrating an example of a database operation command issued by the DBMS to the database operation circuit according to the first embodiment of this invention.

FIG. 6 is a diagram for illustrating an example of a database operation command 500 issued by the DBMS 200 to the database operation circuit 170. This database operation command 500 is an example including a command name 501 of "filtering command". This command 500 is configured such that the start logical block address (LBA) 502=1000, the end LBA 503=2000, the filtering condition 504=X, and the column extraction condition 505=Y. The start LBA 502 is the position to start retrieval and the end LBA 503 is the position to end the retrieval. The DB operation command generation unit 204 generates a plurality of database operation commands 500 to execute a received SQL statement.

The filtering condition 504 and the column extraction condition 505 are parameters to determine the processing to be performed by the database operation circuit 170. The DB operation command generation unit 204 generates a database operation command 500 for each of the areas including a size of 8 MB, for example, to execute the SQL statement. For this reason, a plurality of database operation commands 500 are generated for one SQL statement. The DB operation command generation unit 204 stores the number of the SQL statement and the names of the database operation commands 500 used to execute the SQL statement to the command management table 220.

The DB operation command transmitting unit 205 transmits the generated plurality of database operation commands 500 to the flash module 150.

Figure 7:
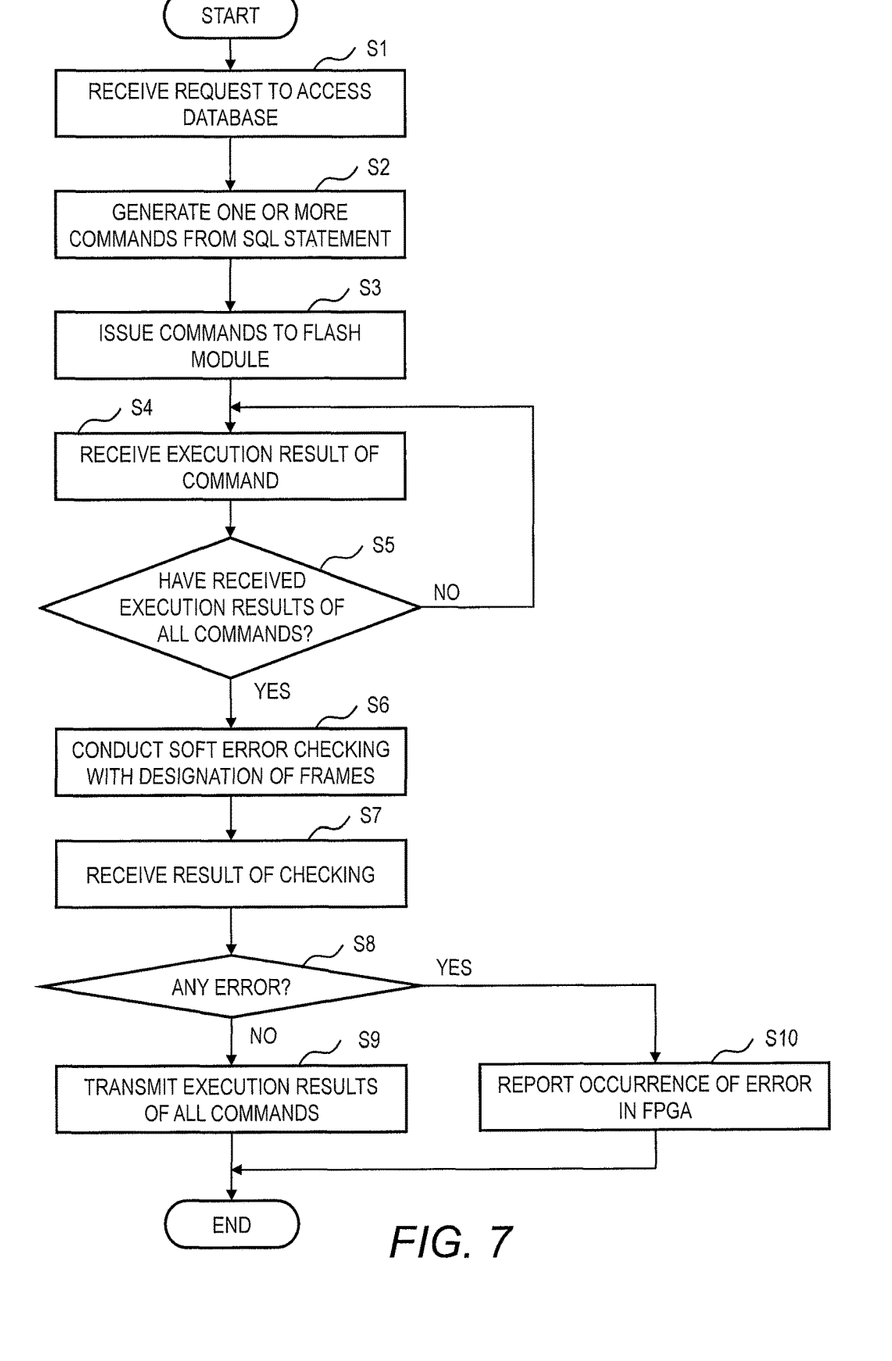
FIG. 7 is a flowchart for illustrating an example of processing to be performed in the server according to the first embodiment of this invention.

FIG. 7 is a flowchart for illustrating an example of processing to be performed in the server 100. This processing is started when the DBMS 200 receives an access request to the database 250.

The DBMS 200 receives an SQL statement as the access request of the client computer 300 from the network 400 (S1). The DBMS 200 generates one or more database operation commands 500 from the SQL statement (S2).

The DBMS 200 transmits the generated database operation commands 500 to the flash module 150 (S3). In the flash module 150, the flash module controller 160 reads data for the database operation commands from the database 250 in the flash memories 180 and forwards the data and the database operation commands 500 to the database operation circuit 170. The database operation circuit 170 executes the database operation commands 500 on the received data and transmits the results to the DBMS 200.

The DBMS 200 receives the execution result of a database operation commands 500 from the flash module 150 (S4). Next, the DBMS 200 determines whether the DBMS 200 has received the execution results of all the database operation commands 500 corresponding to the SQL statement (S5). If the DBMS 200 has received the execution results of all the database operation commands 500, the DBMS 200 proceeds to Step S6. If some database operation command 500 remains for which the execution result has not been received yet, the DBMS 200 returns to Step S4.

At Step S6, the DBMS 200 acquires the DB operation command names 222 corresponding to the SQL number 221 that has just been executed with reference to the command management table 220. The DBMS 200 acquires the frame numbers 212 associated with the DB operation command names 221 acquired from the frame management table 210. The DBMS 200 instructs the database operation circuit 170 in the flash module 150 to detect soft error checking with designation of the acquired frame numbers 212 (the identifiers of the operational elements).

Upon receipt of the result of the soft error checking from the database operation circuit 170 (S7), the DBMS 200 determines whether a soft error exists (S8). If no soft error occurs, the DBMS 200 proceeds to Step S9 and transmits the execution results of the database operation commands to which the aforementioned aggregation processing has been applied to the client computer 300 and terminates the processing.

If a soft error occurs, the DBMS 200 proceeds to Step S10 and notifies the client computer 300 of the occurrence of a soft error in the FPGA of the database operation circuit 170 and terminates the processing. In this case, the DBMS 200 discards the execution results of the database operation commands received from the flash module 150.

In the foregoing processing, the DBMS 200 of the server 100 detects soft error checking on the FPGA after all the plurality of database operation commands 500 have been executed; accordingly, the time required to check for a soft error can be reduced, compared to the case where the soft error checking is detected separately for the individual database operation commands. As a result, the server 100 can reduce the increase in processing time because of the soft error checking when processing data with an FPGA.

Meanwhile, the server 100 detects the soft error checking on only the regions (frame numbers) of the FPGA that are used by the database operation commands. Accordingly, the time required for the soft error checking can be reduced to improve the processing performance of the flash module 150.

The above-described Embodiment 1 provides an example where the database operation circuit 170 is provided within the flash module 150; however, the database operation circuit 170 can be an independent PCIe device connected with the PCIe switch 140.

The above-described Embodiment 1 provides an example where the device storing the database 250 is the flash module 150 including flash memories 180; however, the embodiment is not limited to this configuration. It is effective as far as the database 250 is stored in a non-volatile semiconductor storage device.

Embodiment 2

Figure 8:
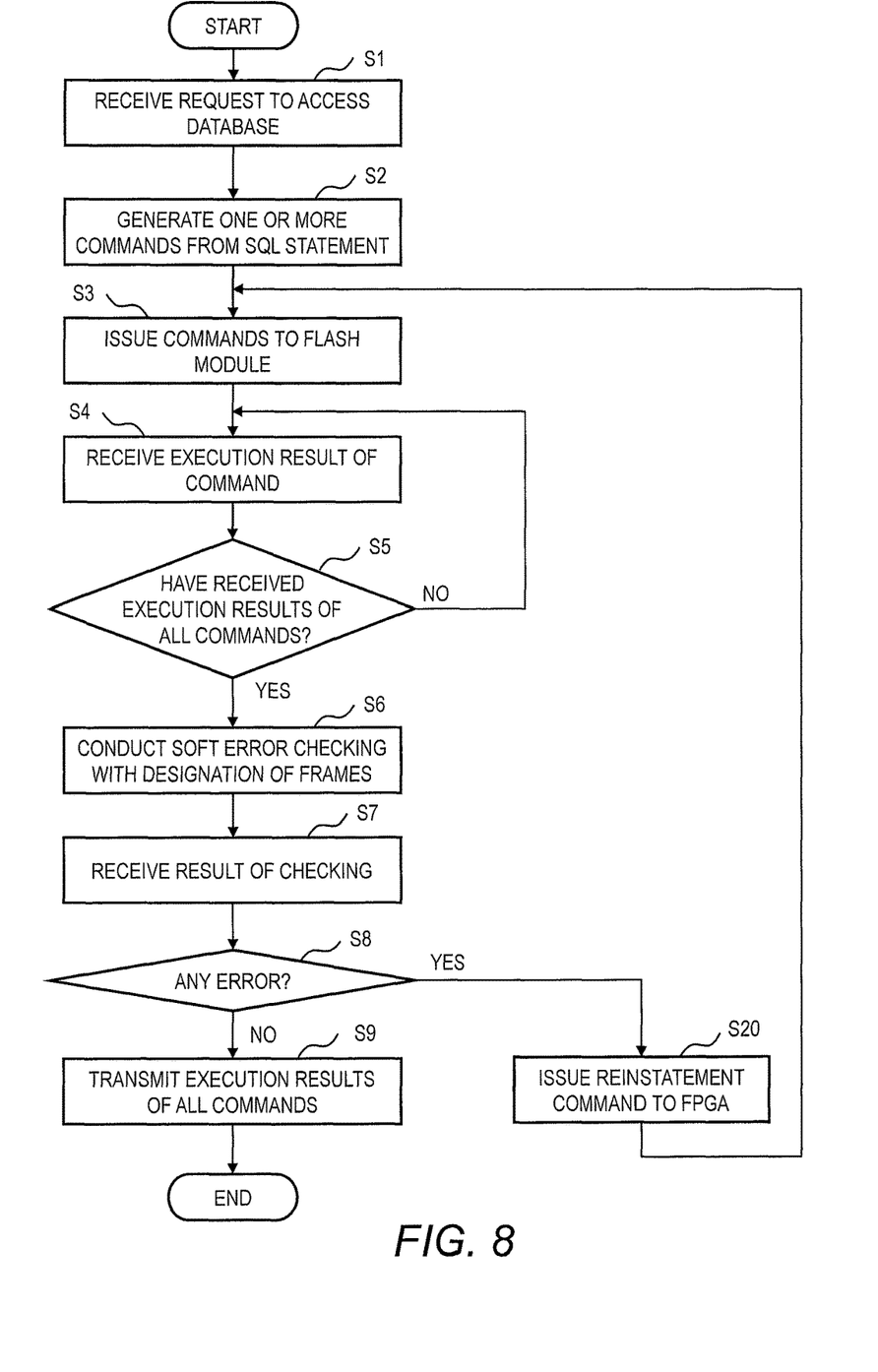
FIG. 8 is a flowchart for illustrating another example of processing to be performed in the server according to a second embodiment of this invention.

FIG. 8 is a flowchart for illustrating another example of processing to be performed in the server 100, representing the second embodiment of this invention. In Embodiment 2, the database operation circuit 170 has a recovery function to correct the soft error in the FPGA; in response to detection of a soft error, the server 100 instructs the database operation circuit 170 to reinstate the FPGA. After completion of the reinstatement, the server 100 makes the FPGA re-execute the database operation commands. The other configuration is the same as the one in the foregoing Embodiment 1.

Since Steps S1 to S9 in FIG. 8 are the same as those in FIG. 7 of Embodiment 1, the duplicate explanation is omitted here. At Step S20 after a soft error is detected, the DBMS 200 issues a command to reinstate the FPGA to the database operation circuit 170.

Upon receipt of a notice of completion of execution of the reinstatement command from the database operation circuit 170, the DBMS 200 returns to Step S3 and makes the database operation circuit 170 re-execute the plurality of database operation commands.

In the foregoing processing, the DBMS 200 issues a reinstatement command to re-execute database operation commands when a soft error occurs in the database operation circuit 170. This configuration of correcting the failure of the database operation circuit 170 caused by a soft error and re-executing database operations enables the service to be provided continuously.

In the description of Step S20, an example is provided where the DBMS 200 receives a notice of completion of execution of the reinstatement command from the database operation circuit 170; however, the DBMS 200 may return to Step S3 when a predetermined time has passed after issuance of the reinstatement command.

Embodiment 3

Figure 9:
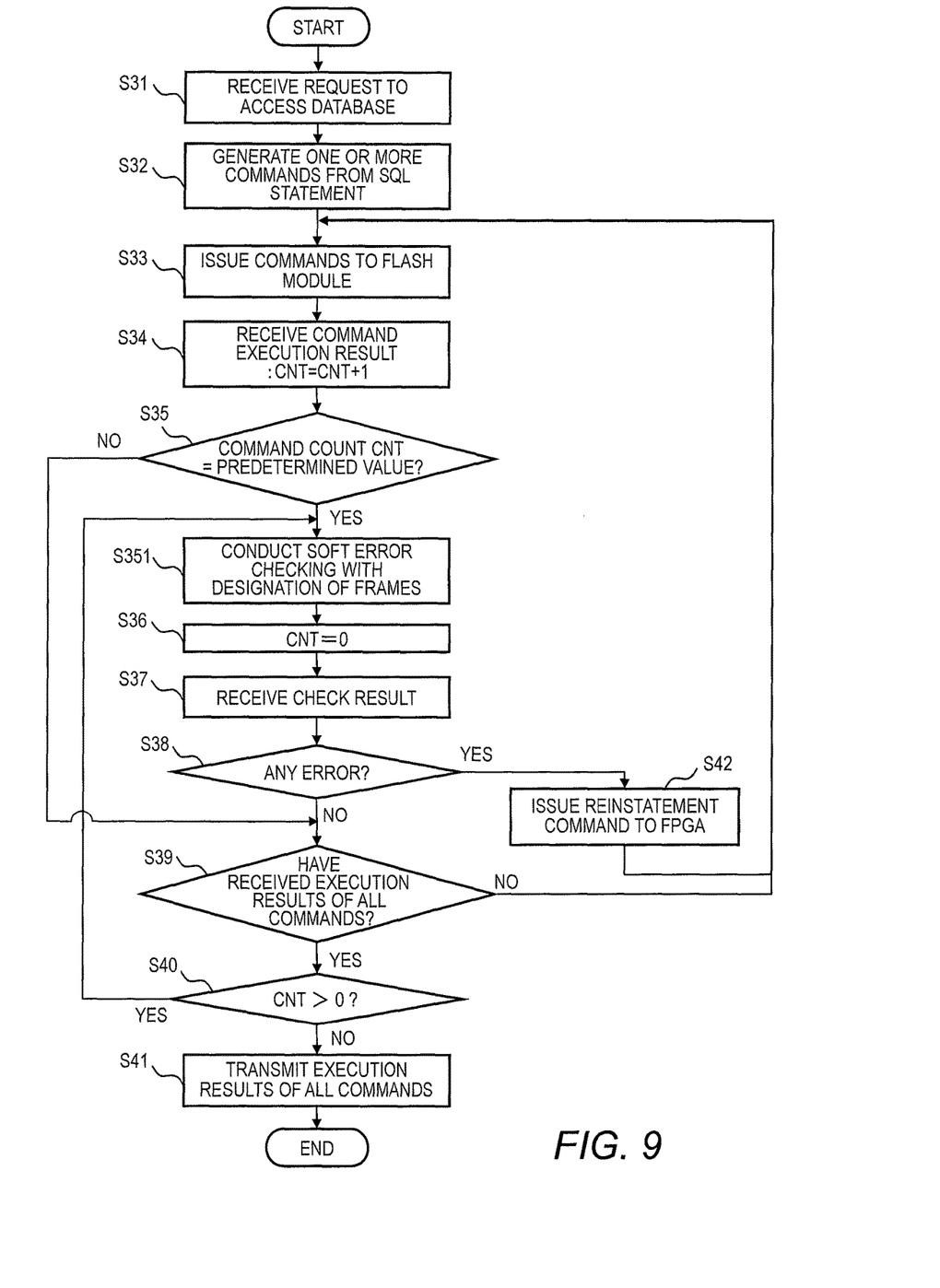
FIG. 9 is a flowchart for illustrating another example of processing to be performed in the server according to a third embodiment of this invention.

FIG. 9 is a flowchart for illustrating another example of processing to be performed in the server 100, representing the third embodiment of this invention. In Embodiment 3, the database operation circuit 170 detects soft error checking when a predetermined number of database operation commands have been executed, if the access request to the database 250 requires access to a large amount of data. The other configuration is the same as the one in the foregoing Embodiment 1.

Steps S31 and S32 are the same as Steps S1 and S2 in FIG. 7, at which the DBMS 200 receives an SQL statement as an access request from the client computer 300 and generates one or more database operation commands 500 from the SQL statement.

Next, the DBMS 200 issues the generated database operation commands 500 to the flash module 150 (S33).

In the flash module 150, the flash module controller 160 reads data for the database operation commands from the database 250 in the flash memories 180 and forwards the data to the database operation circuit 170. The database operation circuit 170 executes each of the database operation commands 500 on the received data and transmits the result to the DBMS 200.

The DBMS 200 receives the execution result of a database operation command 500 from the flash module 150 (S34). The DBMS 200 increments a variable CNT by the number (=1) of executed database operation commands for which the execution results have been received from the flash module 150. Next, the DBMS 200 determines whether the count CNT of executed database operation commands 500 for which the execution results have been received from the flash module 150 has reached a predetermined value (for example, 100) (S35).

If the count CNT of executed database operation commands 500 has reached the predetermined value, the DBMS 200 proceeds to Step S351; if not, the DBMS 200 proceeds to Step S39.

Step S351 is the same as Step S6 in FIG. 7 of Embodiment 1; the DBMS 200 detects soft error checking in units of frames of the FPGA. Next, the DBMS 200 resets the count CNT of executed database operation commands 500 to 0 (S36) and receives the result of the soft error checking from the database operation circuit 170 (S37). The DBMS 200 determines whether any soft error exists with reference to the check result (S38) and if a soft error occurs, proceeds to Step S42 and if not, proceeds to Step S39.

At Step 42 in the case of occurrence of a soft error, the DBMS 200 issues a reinstatement command to the database operation circuit 170, returns to Step 33, and reissues the database operation commands, like above-described Embodiment 2.

In no soft error occurs, the DBMS 200 determines whether execution results have been received for all the generated database operation commands (S39). If the DBMS 200 has received execution results of all the database operation commands 500 corresponding to the SQL statement, the DBMS 200 proceeds to Step S40. If some database operation command 500 remains for which the execution result has not been received yet, the DBMS 200 returns to Step S33 and issues the remaining database operation commands.

At Step S40, if the variable CNT indicating the number of executed database operation commands is larger than 0, it means that there are execution results on which soft error checking has not been detected yet; accordingly, the DBMS 200 returns to Step S351 and repeats the soft error checking.

If the variable CNT is 0, it means that all the database operation commands have been executed and no error has been detected from the regions of the FPGA used in the database operation commands with respect to the execution results of all database operation commands; accordingly, the DBMS 200 aggregates all execution results and transmit them to the client computer 300 (S41).

In the foregoing processing, the DBMS 200 detects soft error checking on the FPGA of the database operation circuit 170 each time the number of executed database operation commands reaches a predetermined value and if a soft error occurs, issues a reinstatement command and thereafter, re-issues the database operation commands.

In Embodiment 3, soft error checking on the FPGA is detected each time the count CNT of executed database operation commands reaches a predetermined value before all database operation commands have been executed; accordingly, the database operation circuit 170 can efficiently process a large amount of data. This is because, if soft error checking after execution of all database operation commands results in detection of a soft error, re-executing all the database operation commands significantly increases the processing time.

However, the DBMS 200 detects soft error checking each time the count CNT of executed database operation commands reaches a predetermined value; accordingly, the amount of data to be processed by the re-issued database operation commands after occurrence of a soft error can be small to reduce the overall processing time in the case of occurrence of a soft error.

Embodiment 4

Figure 10:
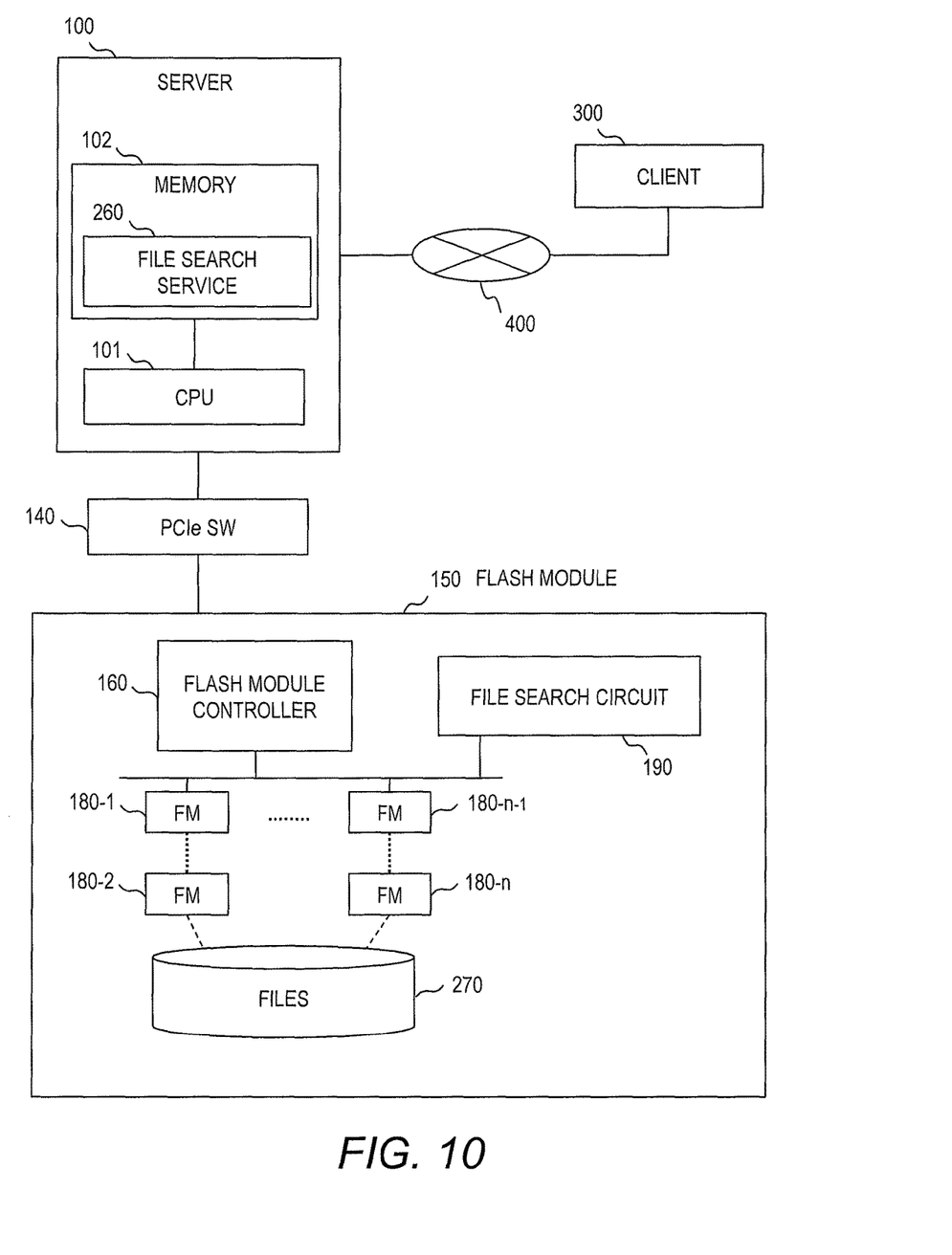
FIG. 10 is a block diagram for illustrating another example of the computer system according to a fourth embodiment of this invention.

FIG. 10 is a block diagram for illustrating another example of the computer system, representing the fourth embodiment of this invention. FIG. 10 provides an example where a file search service 260 is provided to the client computer 300, in place of the DBMS 200 in the foregoing Embodiment 1.

In Embodiment 4, in place of the database 250 in Embodiment 1, one or more files 270 are stored in the flash memory 180 of the flash module 150; and in place of the database operation circuit 170, a file search circuit 190 implemented by an FPGA is incorporated in the flash module 150.

In place of the DBMS 200 in Embodiment 1, the file search service 260 is stored in the memory 102 of the server 100. The file search service 260 receives a search string from the client computer 300, selects files 270 including the search string from the flash memories 180, and notifies the client computer 300.

Like the DBMS 200 in Embodiment 1, the file search service 260 generates a plurality of search commands from a search string and issues the search commands to the flash module 150. In the flash module 150, the flash module controller 160 acquires data designated by the plurality of search commands from the files 270 and forwards the data to the file search circuit 190.

The file search circuit 190 executes the plurality of search commands on the received data and transmits the execution results of the search commands to the server 100. The file search service 260 of the server 100 detects soft error checking on the file search circuit 190 when all the search commands have been executed. If no soft error occurs, the file search service 260 aggregates the execution results of the search commands and responds the aggregated execution results to the client computer 300, like in Embodiment 1.

If a soft error occurs, the file search service 260 notifies the client computer 300 of the occurrence of a soft error, like in Embodiment 1. Alternatively, the file search service 260 issues a command to reinstate the FPGA to the file search circuit 190 and re-executes the search commands, like in Embodiment 2.

In the foregoing processing, the soft error checking on the FPGA is detected after all the plurality of search commands have been executed; accordingly, the time required to check for a soft error can be reduced, compared to the case where the soft error checking is detected separately for the individual search commands. As a result, the increase in processing time because of the soft error checking can be reduced when data is processed with an FPGA.

Meanwhile, like in Embodiment 1, the soft error checking is detected on only the regions (frame numbers) of the FPGA that are used by the search commands. Accordingly, the time required for the soft error checking can be reduced to improve the processing performance of the flash module 150.

Although Embodiment 1 provides an example where this invention is applied to the database 250 and Embodiment 4 provides an example where this invention is applied to the file search service 260, the application of this invention is not limited to these. This invention is applicable to an FPGA for processing data retrieved from the flash memories 180.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A computer system comprising:
   a computer including a processor and a memory; and
   a storage device connected with the computer and configured to store data,
   wherein the storage device includes:
      a non-volatile semiconductor storage unit including a non-volatile semiconductor memory and configured to store data;
      a controller configured to control read and write for the non-volatile semiconductor storage unit; and
      an FPGA configured to receive data and an operation command from the controller and perform an operation on the data in accordance with the operation command,
   wherein the computer includes:
      a receiving unit configured to receive an access request to the data;
      a command generation unit configured to generate one or more operation commands from the access request;
      a command transmitting unit configured to transmit the operation commands to the storage device;
      an operation result receiving unit configured to receive execution results of the operation commands from the storage device;
      an aggregation unit configured to aggregate the execution results of the operation commands;
      a responding unit configured to respond the aggregated execution results of the operation commands; and
      an FPGA checking unit configured to check for a soft error in the FPGA,
   wherein the FPGA checking unit is configured to instruct the FPGA to check for a soft error and receive a response whether a soft error exists from the FPGA when number of executed operation commands reaches a predetermined value, and
   wherein the responding unit is configured to transmit the aggregated execution results of the operation commands in a case where execution results of all the generated operation commands have been received and no soft error exists.

2. The computer system according to claim 1,
   wherein the data stored in the non-volatile semiconductor storage unit is a database,
   wherein the access request includes an SQL statement for the database, and
   wherein the command generation unit is configured to generate one or more operation commands corresponding to the SQL statement.

3. The computer system according to claim 2,
   wherein the computer includes:
      command management information configured to store operation commands to be used for the SQL statement; and
      frame management information configured to store identifiers of operational elements in the FPGA configured to execute operation commands, and
   wherein the FPGA checking unit is configured to instruct the FPGA to check for a soft error with designation of identifiers of operational elements of the FPGA used to execute the operation commands.

4. The computer system according to claim 1, wherein the FPGA checking unit is configured to issue a reinstatement command to the FPGA in a case where a soft error is detected from the FPGA.

5. The computer system according to claim 4, wherein the command transmitting unit is configured to retransmit the generated operation commands to the storage device after the FPGA has completed the reinstatement command.

6. The computer system according to claim 1,
   wherein the predetermined value is equal to number of the operation commands generated by the command generation unit, and
   wherein the FPGA checking unit is configured to instruct the FPGA to check for a soft error after all the operation commands are completed.

7. A computer system control method for controlling a computer and a storage device,
   the computer including a processor and a memory,
   the storage device being connected with the computer and configured to store data,
   the storage device including:
      a non-volatile semiconductor storage unit including a non-volatile semiconductor memory and configured to store data;
      a controller configured to control read and write for the non-volatile semiconductor storage unit; and
      an FPGA configured to receive data and an operation command from the controller and perform an operation on the data in accordance with the operation command, and
   the computer system control method comprising:
      a first step of receiving, by the computer, an access request to the data;
      a second step of generating, by the computer, one or more operation commands from the access request;
      a third step of transmitting, by the computer, the operation commands to the storage device;
      a fourth step of receiving, by the computer, execution results of the operation commands from the storage device;
      a fifth step of aggregating, by the computer, the execution results of the operation commands;
      a sixth step of instructing, by the computer, the FPGA to check for a soft error and receiving, by the computer, a response whether a soft error exists from the FPGA when number of executed operation commands reaches a predetermined value; and a seventh step of transmitting, by the computer, the aggregated execution results of the operation commands in a case where execution results of all the generated operation commands have been received and no soft error exists.

8. The computer system control method according to claim 7,
wherein the data stored in the non-volatile semiconductor storage unit is a database,
wherein the access request includes an SQL statement for the database, and
wherein the second step includes generating one or more operation commands corresponding to the SQL statement.

9. The computer system control method according to claim 8, wherein the sixth step includes instructing the FPGA to check for a soft error with designation of identifiers of operational elements of the FPGA used to execute the operation commands with reference to command management information configured to store operation commands to be used for the SQL statement and frame management information configured to store identifiers of operational elements in the FPGA configured to execute operation commands.

10. The computer system control method according to claim 7, wherein the sixth step includes issuing a reinstatement command to the FPGA in a case where a soft error is detected from the FPGA.

11. The computer system control method according to claim 10, wherein the third step includes retransmitting the generated operation commands to the storage device after the FPGA has completed the reinstatement command.

12. The computer system control method according to claim 7,
wherein the predetermined value is equal to number of the operation commands generated in the second step, and
wherein the sixth step includes instructing the FPGA to check for a soft error after all the operation commands are completed.

\* \* \* \* \*